United States Patent [19]

Suzuki et al.

[11] Patent Number: 5,187,014
[45] Date of Patent: Feb. 16, 1993

[54] METHOD OF MANUFACTURING A PRODUCT OF ONE-PIECE CONSTRUCTION WHEREIN SILICONE RUBBER HAS BEEN MADE TO ADHERE

[75] Inventors: Akio Suzuki; Masaaki Matsumura; Takeshi Hashimoto, all of Gunma, Japan

[73] Assignee: Shin-Etsu Chemical Company, Limited, Tokyo, Japan

[21] Appl. No.: 567,587

[22] Filed: Aug. 15, 1990

[30] Foreign Application Priority Data

Aug. 15, 1989 [JP] Japan .................................. 1-210979

[51] Int. Cl.$^5$ ............................ B32B 9/04; C09J 5/02
[52] U.S. Cl. .............................. 428/447; 106/287.15; 156/307.5; 156/326; 427/409; 427/412.1
[58] Field of Search ......................... 156/307.5, 326; 106/287.15; 427/412.1, 409; 428/447

[56] References Cited

U.S. PATENT DOCUMENTS

| | | | |
|---|---|---|---|
| 4,243,718 | 1/1981 | Murai et al. ....................... | 156/307.5 |
| 4,431,472 | 2/1984 | Höhl et al. ......................... | 156/326 |
| 4,534,815 | 8/1985 | Hamada et al. ................... | 156/307.5 |

*Primary Examiner*—John J. Gallagher
*Attorney, Agent, or Firm*—Millen, White, Zelano and Branigan

[57] ABSTRACT

This invention discloses a method of manufacturing a product of one-piece construction wherein silicone rubber has been made to adhere, characterized in that a substrate is immersed in a primer comprising:

(A) A silicon compound containing at least 1 organic group with an aliphatic unsaturated bond and at least 1 hydrolyzable group bonded to a silicon atom, (B) A silicon compound containing at least 1 organic group with an epoxy group, and at least 1 hydrolyzable group bonded to a silicon atom, (C) Platinum or a platinum compound, (D) An organic solvent, and after drying, the substrate and silicone rubber are heated together with pressure contact.

21 Claims, No Drawings

METHOD OF MANUFACTURING A PRODUCT OF ONE-PIECE CONSTRUCTION WHEREIN SILICONE RUBBER HAS BEEN MADE TO ADHERE

FIELD OF THE INVENTION

This invention relates to a method of making a resin or metal substrate adhere to silicone rubber, and in particular a method of manufacturing a product of one-piece construction wherein silicone rubber has been made to adhere.

BACKGROUND OF THE INVENTION

In recent years, silicone rubber has been finding increasing application in the electrical, electronics, office machine and automobile fields. A need has therefore emerged to develop parts of one-piece construction wherein a thermoplastic resin, thermosetting resin or a metal substrate is made to adhere strongly to silicone rubber.

Conventionally, to make a substrate adhere to silicone rubber in a one-piece construction, a primer containing a titanium ester was first applied to the substrate.

As said titanium ester was hydrolyzed by moisture in the air, however, the surface of the applied primer sometimes turned white under conditions of high temperature and high humidity, there was insufficient time for manipulation after applying the primer and the adhesive bond obtained was sometimes unstable.

Further, to obtain a large number of parts of one-piece construction, such as the large number of small components used in automobiles, the primer was sometimes applied to the substrates by dipping. If however several substrates were laid on top of each other, they sometimes stuck together after drying in a current of air and the overlapping parts turned white.

In Japanese Patent Kokoku (Published Examined Japanese Patent) No. 60-39101, a primer composition containing a vinyl acetate polymer is disclosed. This however can be used only where the silicone rubber which is made to the substrate is an addition curing type, and it also suffered from the disadvantage that the adhesive contact surface turned to yellow or brown at high temperature.

The inventors, after intensive efforts to resolve the above disadvantages, obtained excellent results using the silicone compound of given composition as a primer, and thereby arrived at the present invention.

SUMMARY OF THE INVENTION

The object of the present invention, therefore, is to provide a method of manufacturing a product of one-piece construction wherein silicone rubber is made to adhere strongly to a substrate by means of a primer composition.

The object of the present invention is attained by a method of manufacturing a product of one-piece construction wherein silicone rubber has been made to adhere, characterized in that a substrate is immersed in a primer comprising:

(A) A silicon compound containing at least 1 organic group with an aliphatic unsaturated bond and at least 1 hydrolyzable group bonded to a silicon atom, (B) A silicon compound containing at least 1 organic group with an epoxy group, and at least 1 hydrolyzable group bonded to a silicon atom, (C) platinum or a platinum compound, (D) An organic solvent, and after drying, said substrate and silicone rubber are heated together with pressure contact.

DETAILED DESCRIPTION OF THE INVENTION

The organic group with an aliphatic unsaturated bond in component (A) of the primer composition used in the manufacturing method of the present invention may for example be an alkenyl group with 2 to 8 carbon atoms, such as vinyl, allyl, propenyl or butenyl; methacryloxypropyl or acryloxypropyl.

The hydrolyzable group bonded to a silicon atom may for example be an alkoxy group such as methoxy, ethoxy, propoxy or butoxy, an acyloxy group such as acetoxy or propionoxy, an alkenyloxy group such as propenyloxy or isobutenyloxy, an iminoxy group such as dimethylketoxime, methylethylketoxime, diethylketoxime, cyclopentanoxime or cyclohexanoxime, an amino group such as N-methylamino, N-ethylamino, N-propylamino, N-butylamino, N,N-dimethylamino or cyclohexylamino, an amide group such as N-methylacetoamide, N-ethylacetoamide or N-methylbenzamide and an aminoxy group such as N,N-dimethylaminoxy or N,N-diethylaminoxy.

As for the component (A), a silane compound which has three hydrolyzable groups in one molecule, or partially hydrolyzed compounds thereof are preferred.

Specific examples of such silicon compounds are vinyl trimethoxysilane, vinyl triethoxysilane, vinyltri(methoxy ethoxy)silane, γ-methacryloxypropyltrimethoxy-silane, and vinyltrioximesilane.

The organic group with an epoxy group in component (B) of the primer composition of this invention may for example be γ-glycidoxypropyl or β-(3,4-epoxycyclohexyl) ethyl.

As for the hydrolyzable group in component (B), the same hydrolyzable groups which are mentioned for component (A) can be also given. A preferred silicon compound of component (B) is a silane compound which has 2 or 3 hydrolyzable groups in one molecule or partially hydrolyzed compounds thereof. Specific examples of component (B) being γ-glycidoxypropyl-trimethoxysilane, γ-glycidoxypropyl-triethoxysilane, γ-glycidoxypropylmethyl diethoxysilane, and β-(3,4-epoxycyclohexyl) ethyltrimethoxysilane.

Component (C) may be platinum or a platinum compound. Specific examples of platinum compounds are $H_2PtCl_6 \cdot nH_2O$, $NaHPtCl_6 \cdot nH_2O$, $KHPtCl_6 \cdot nH_2O$, $Na_2PtCl_6 \cdot nH_2O$, $PtCl_4 \cdot nH_2O$, or complexes of these compounds with other compounds containing unsaturated bonds or alcohols.

The mixing proportion of components (A)–(C) above is such that (A) and (B) each represents 20–80 weight %, but preferably 40–60 weight %, and such that (C) represents 0.001–0.01 weight %, but preferably 0.002–0.005 weight %, with respect to the total weight of (A), (B) and (C).

Specific examples of the organic solvent which is component (D) of the primer composition of this invention are aliphatic or aromatic solvents, esters, ketones or halogenated hydrocarbons. It is however preferable to use a solvent of low surface tension from the viewpoint of applying a uniform coat of primer, and particularly preferable to use n-hexane which has a low surface tension.

The total proportion of components (A), (B) and (C) is 0.1-20 weight %, and preferably 0.5-10 weight %, with respect to the total weight of components (A), (B), (C) and (D).

The substrate is immersed in the primer composition consisting of components (A)-(D) above, and after drying, silicone rubber is made to adhere strongly by heat with pressure contacts so as to obtain a product of one-piece construction. As the primer composition of this invention is not easily affected by environmental conditions such as temperature and humidity, the adhesive bond to the silicone rubber is not only strong but stable.

Further, even if substrates overlap when the products are dried as mentioned above, there is no whitening or sticking of the overlapping parts.

In this invention, a thermoplastic resin, thermosetting resin or a metal may, for example, be used as a substrate. This substrate may for example be a thermoplastic resin such as a polyamide resin, a saturated polyester resin, a noryl resin, a polyphenylenesulfide resin, a vinyl chloride resin or an ABS resin, a thermosetting resin such as a phenol resin or epoxy resin, or a metal such as iron, aluminium or stainless steel. The primer composition of this invention is applied to these substrates by immersing said substrates in the primer composition.

If the immersion time is less than 3 hours, the adhesive bond obtained may be unstable, and it is therefore preferable to immerse the substrates for no less than 3 hours.

The silicone rubber which is made to adhere to the substrate, of which the surface has been treated with the primer composition of this invention as described above, may be of the addition, peroxide or condensation curing type.

The adhesion to the silicone rubber of the substrate treated with primer as described above may easily be obtained, after drying the substrate, by heating it in contact with the silicone rubber under pressure. The heating temperature is 80° C.-180° C., and preferably 100° C.-150° C. Further, heating may also be carried out if necessary when the substrate which has been treated with primer is dried.

The primer composition used in the manufacturing method of this invention is not much affected by environmental conditions. There is no whitening of the surface which has been treated with primer, and there is thus sufficient time for manipulation after applying the primer to obtain a stable, strong adhesion to silicone rubber. Further, there is no sticking of substrates to one another or whitening of parts where substrates overlap.

EXAMPLES

We shall now describe this invention in more detail by means of examples, but it should be understood that the invention is in no way limited to them.

EXAMPLE 1

The components in Table 1 below were mixed together and dissolved to give a primer composition.

TABLE 1

| Primer Composition/ | Present Invention | Comparative Example | | |
|---|---|---|---|---|
| Constituent | (a) | (b) | (c) | (d) |
| γ-glycidoxylpropyl- | 5 | — | 10 | 6 |

TABLE 1-continued

| Primer Composition/ | Present Invention | Comparative Example | | |
|---|---|---|---|---|
| Constituent | (a) | (b) | (c) | (d) |
| trimethoxysilane | | | | |
| vinyltrimethoxysilane | 5 | 10 | — | 6 |
| chloroplatinic acid (platinum 1%) | 2 | 2 | 2 | — |
| n-hexane | 240 | 240 | 240 | 240 |

6,6 nylon sheet (Nihon Test Panel K.K.) was immersed in the above composition at room temperature for 3 hours, and dried in a current of air for 1 hour. Addition type silicone rubber KE1940-50A/B (Shin-Etsu Kagaku Kogyo K.K.) and peroxide type silicone rubber KE951U (containing 1.2 weight % 1,1-bis (t-butyl peroxy) 3,3,5-trimethylcyclohexane: Shin-Etsu Kagaku Kogyo K.K.) were placed in intimate contact with said nylon sheet, and heated with pressure contact at 120° C. for 10 minutes to form products of one-piece construction.

Further, condensation type silicone rubber KE45TRTV (Shin-Etsu Kagaku Kogyo K.K.) was placed in intimate contact with said nylon sheet, and left at room temperature for 1 day to form a product of one-piece construction.

The products of one-piece construction so obtained were subjected to a peeling test at 180° (degree). The results are shown in Table 2.

TABLE 2

| Primer Composition/ | Present Invention | Comparative Example | | |
|---|---|---|---|---|
| Silicone Rubber | (a) | (b) | (c) | (d) |
| KE1940-50A/B | ○ | × | Δ | × |
| KE951U | ○ | × | × | × |
| KE45T | ○ | × | ○ | × |

The symbols in the Table have the following significance:

○: adheres well
Δ: adheres partially
×: does not adhere

As can be seen from Table 2, silicone rubber adheres strongly to 6,6 nylon if the primer composition of this invention is used.

EXAMPLE 2

Epoxy resin, bakelite, hard PVC, PBT, noryl PPS, ABS, iron, aluminium and SUS 304 sheets (Nihon Test Panel K.K.) were immersed in the primer composition of this invention at room temperature for 5 hours, and were then dried under conditions of 5° C./50% RH and 35° C./90% RH for 2 days.

KE1940-50A/B used in Example 1 was then placed in intimate contact with the sheets, and heated with pressure contact to form products of one-piece construction.

These products of one-piece construction were subjected to a peeling test at 180° (degree). It was found that in the case of all the sheets, a firm bond to silicone rubber was obtained.

What is claimed is:

1. In a method of manufacturing a product of one-piece construction wherein silicone rubber is adheringly bonded to a surface of a substrate coated with a primer, the improvement which comprises the steps of:

immersing the surface of said substrate for more than 3 hours in a primer consisting essentially of:
- (A) a silicon compound containing at least 1 organic group with an aliphatic unsaturated bond and at least 1 hydrolyzable group bonded to a silicon atom,
- (B) a silicon compound containing at least 1 organic group with an epoxy group, and at least 1 hydrolyzable group bonded to a silicon atom,
- (C) platinum or a platinum compound, and
- (D) an organic solvent;

drying the resultant primer-coated surface; and
bonding said substrate and said silicone rubber together with heat while in pressure contact.

2. The method of claim 1, wherein said organic group with an aliphatic unsaturated bond is selected from the group consisting of vinyl, allyl, propenyl, butenyl, methacryloxypropyl and acryloxypropyl group.

3. The method of claim 1, wherein said hydrolyzable group bonded to a silicon atom is selected from the group consisting of an alkoxy, acyloxy, alkenyloxy, iminoxy, amino, amide and aminoxy group.

4. The method of claim 1, wherein the mixing proportion of components (A)–(C) is such that (A) and (B) each represents 20–80 weight % and (C) represents 0.001–0.01 weight %.

5. The method of claim 4, wherein the mixing proportion of components (A) and (B) is 40–60 weight %, respectively.

6. The method of claim 4, wherein the mixing proportion of component (C) is 0.002–0.005 weight %.

7. The method of claim 5, wherein the mixing proportion of component (C) is 0.002–0.005 weight %.

8. The method of claim 1, wherein component (D) is an organic solvent selected from the group consisting of aliphatic or aromatic solvents, esters, ketones and halogenated hydrocarbons.

9. The method of claim 1, wherein component (D) is a solvent of low surface tension.

10. The method of claim 9, wherein component (D) is a n-hexane.

11. The method of claim 1, wherein the total proportion of components (A), (B) and (C) is 0.1–20 weight % with respect to the total weight of component (A), (B), (C) and (D).

12. The method of claim 11, wherein said total proportion of components (A), (B), and (C) is 0.5–10 weight %.

13. The method of claim 1, wherein said substrate is selected from the group consisting of thermoplastic resins, thermosetting resins or metals.

14. The method of claim 1, wherein the substrate and silicone rubber are heated to the temperature 80° C.–180° C.

15. The method of claim 14, wherein said temperature is 100° C.–150° C.

16. A method according to claim 1, wherein component (A) is selected from the group consisting of vinyl trimethoxysilane, vinyl triethoxysilane, vinyl tri(methoxyethoxy)silane, γ-methacryloxypropyltrimethoxysilane, and vinyl trioxaminesilane.

17. A method according to claim 1, wherein component (B) is selected from the group consisting of γ-glycidoxypropyltrimethoxysilane, γ-glycidoxypropyltriethoxysilane, γ-glycidoxypropylmethyldiethoxysilane, and β-(3,4-epoxycyclohexyl)ethyltrimethoxysilane.

18. A method according to claim 1, wherein component (C) is platinum or a platinum compound selected from the group consisting of $H_2PtCl_6 \cdot nH_2O$, $NaHPtCl_6 \cdot nH_2O$, $KHPtCl_6 \cdot nH_2O$, $Na_2PtCl_6 \cdot nH_2O$, $PtCl_4 \cdot nH_2O$, and complexes thereof with alcohols or compounds with unsaturated bonds.

19. A method according to claim 1, wherein component (A) is γ-glycidoxypropyltrimethoxysilane, component (B) vinyl trimethoxysilane, component (C) is chloroplatinic acid, and component (D) is n-hexane.

20. A product of one-piece construction comprising a substrate member with a silicone rubber member adheringly bonded to a surface thereof and produced according to the method of claim 1.

21. In a method of manufacturing a product of one-piece construction wherein silicone rubber is adheringly bonded to a surface of a substrate coated with a primer, the improvement which comprises the steps of:
immersing the surface of said substrate for more than 3 hours in a primer comprising:
- (A) a silicon compound containing at least 1 organic group with an aliphatic unsaturated bond and at least 1 hydrolyzable group bonded to a silicon atom,
- (B) a silicon compound containing at least 1 organic group with an epoxy group, and at least 1 hydrolyzable group bonded to a silicon atom,
- (C) platinum or a platinum compound, and
- (D) an organic solvent, wherein said solvent is n-hexane;

drying the resultant primer-coated surface; and
bonding said substrate and said silicone rubber together with heat while in pressure contact.

* * * * *